United States Patent Office 3,503,789
Patented Mar. 31, 1970

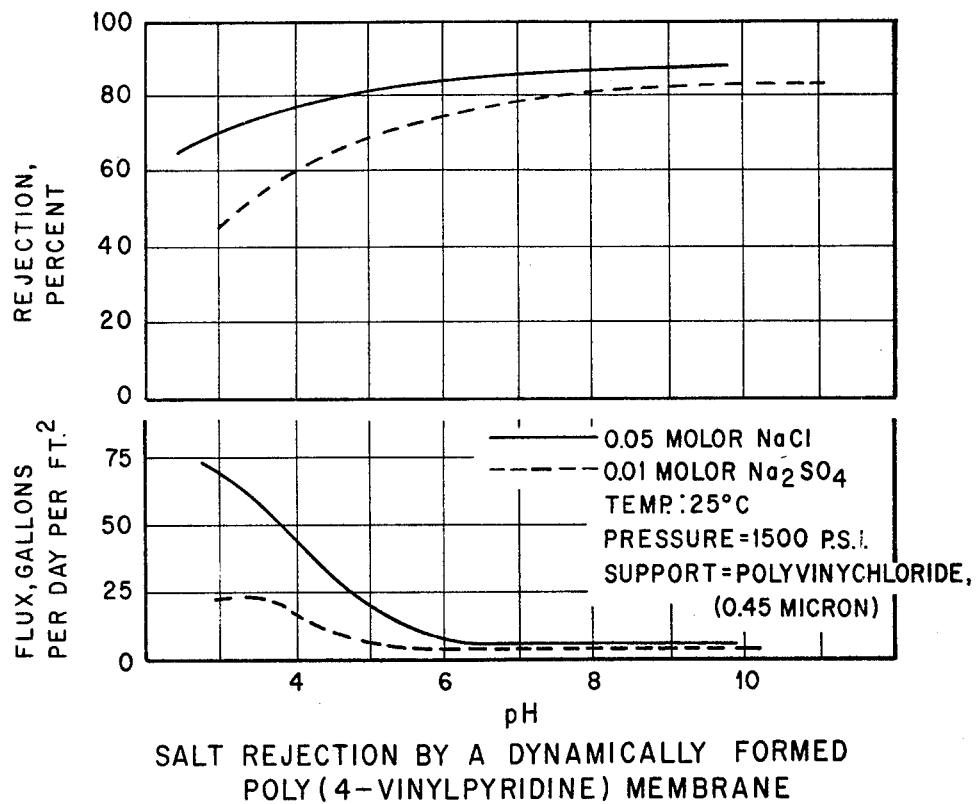
SALT REJECTION BY A DYNAMICALLY FORMED
POLY(4-VINYLPYRIDINE) MEMBRANE
INVENTORS.
James S. Johnson
Kurt A. Kraus
ATTORNEY.

3,503,789
METHOD OF MAKING A DYNAMIC SOLUTE-REJECTING MEMBRANE
James S. Johnson and Kurt A. Kraus, Oak Ridge, Tenn., assignors to the United States of America as represented by the United States Atomic Energy Commission
Filed May 5, 1967, Ser. No. 637,878
Int. Cl. B44d 1/44; B01d 13/04
U.S. Cl. 117—98                                    3 Claims

ABSTRACT OF THE DISCLOSURE

A method of making a dynamic permeable membrane capable of rejecting solutes from an aqueous solution comprising forming said membrane in a charged state by contacting a permeable substrate having pores with diameters in the range of 30 A. to 5 microns with an aqueous phase containing a finely dispersed polymer comprising a weakly ionizable electrolyte and having a pH at a level such that said polymer exists in a charged state, thereby depositing a charged membrane of said polymer on said substrate, and after said membrane is formed adjusting the pH of the solution in contact with it to convert it toward a neutral form, thereby modifying the solute-rejection properties of said membrane.

BACKGROUND OF THE INVENTION

The invention described herein was made in the course, of, or under, a contract with the United States Atomic Energy Commission and in the course of work performed for the Office of Saline Water of the United States Department of the Interior.

Our invention relates to dynamically formed membranes useful in hyperfiltration methods of reducing the concentration of solutes in aqueous solutions.

Solute-rejecting membranes can be dynamically formed on a permeable substrate by contacting said substrate with an aqueous phase containing a wide variety of materials including ion exchange and neutral organic materials. Membranes formed dynamically on permeable bodies from either ion exchange or neutral organic materials have advantages over conventional cast membranes of their ease of preparation and capability of self-healing defects which may occur. Reference is made to copending co-assigned application Ser. No. 504,277, filed Oct. 23, 1965, now Patent No. 3,449,245, for "A Method of Separating Salts from Aqueous Solutions" for details about such membranes.

Membranes formed from ion exchange materials ordinarily combine good rejection values for solutes at low feed concentrations with high transmission rates through membranes; however, they are often adversely affected by polyvalent counter-ions, and their rejection usually decreases at higher feed concentrations. Neutral organic materials have the advantage of a rejection which is relatively insensitive to the ionic species and their concentration in the feed, but have the disadvantage of low permeation rates. Membranes having advantages of both neutral and ion exchange membranes are desirable.

SUMMARY OF THE INVENTION

It is accordingly one object of our invention to provide a dynamically formed membrane which can be modified to have a desired mixture of properties of an ion-exchange and of a neutral membrane.

It is another object of our invention to provide a method of making dynamically a solute-rejecting membrane having a high rejection value which is also relatively insensitive to the presence of polyvalent counter-ions.

Other objects of our invention will become apparent from the following description and claims.

In accordance with our invention we have provided a method of making a dynamic solute-rejecting membrane comprising contacting a permeable substrate with an aqueous phase containing a finely-dispersed organic polymer comprising a weakly ionizable electrolyte and having a pH at a level such that said polymer deposits onto said substrate in a charged state, and contacting the resulting charged membrane with an aqueous phase having a different pH, thereby modifying the solute-rejection properties of said membrane.

The membrane made in accordance with our invention possesses the unique combination of attributes of being relatively insensitive to the ionic species in the aqueous phase and having a high solute-rejection value; furthermore, its rejection and permeability properties can be modified by changing the pH of the solution in contact with it.

BRIEF DESCRIPTION OF THE DRAWING

The figure shows curves giving the hyperfiltration properties of a membrane formed from poly(4-vinylpyridine) as a function of pH. As can be determined from these curves, with this membrane the rejection increases as the pH is raised, while the permeation rate decreases. It is also obvious that while at low pH values the rejection of sulfate is considerably lower than that of chloride, as the pH is increased the rejection values for both ions increase and that for sulfate approaches that for chloride.

DESCRIPTION OF THE PREFERRED EMBODIMENTS

In carrying out our invention an aqueous phase containing a weakly ionized electrolyte is forced past the surface of a permeable substrate under conditions whereby a portion of said aqueous phase passes through it. As is disclosed in application Ser. No. 504,277, now Patent No. 3,449,245, the permeable substrate may be of any material capable of maintaining its integrity under the pressures involved and in the presence of water and its dissolved salts. The chemical nature of the substrate is not of primary significance, and materials of such widely diverse natures as metal filters, porcelain frits, glass frits, and organic materials such as permeable papers may be used. Small diameter porous carbon and porous ceramic tubes are especially useful.

The diameters of the pores in the substrate should lie in the range of 30 A. to 5 microns. preferably 0.1 to 1 micron.

The polymer comprising a weakly ionizable electrolyte may be selected from a wide range of materials and may be characterized as those which, when made neutral, have a chemical nature such that the activity coefficient $\gamma_\pm$* of sodium chloride would be high in low-water-fraction solutions containing organic material of similar chemical nature. Preferably the value of $\gamma_\pm$*, referred to infinite dilution of solute in pure water, and consistent with concentration of salt expressed in moles/kg. water, should be greater than 1 at a water content of less than 10%. Methods of determination of activity coefficients are well known; a procedure convenient in many cases is measurement of solubility of the solute of interest in model water-organic systems. Low solubilities indicate a favorable material. More details pertinent to these methods of testing organic-water systems for suitability in forming rejecting barriers may be found in the Journal of the American Chemical Society, 86, 2571 (1964) and in the Journal of Physical Chemistry, 69, 2697 (1965). The polymers may be acidic, as represented by polycarboxylic acid, or basic, as represented by polymers containing primary, secondary, or tertiary amines and those amines which are slightly quaternized. With a given amine the pH range at which it changes from a neutral to an ionized form can be changed by introducing substituent groups into the polymer.

Our invention will be illustrated in more detail by discussion of the amine polymers. Any of the weakly ionizable amines taught as useful in application Ser. No. 504,277, now Patent No. 3,449,245 and considered as neutral compounds therein may be used in our process. The term "neutral organic compound" is intended to refer to an organic compound whose hyperfiltration properties do not depend upon the presence of ionizable groups and includes compounds having a concentration of ion exchange groups too low to affect substantially the rejection properties, or a low density of ion exchange groups introduced intentionally to increase the solubility of a neutral material otherwise too insoluble to be useful. Typical of the useful weakly ionizable amines are polyvinyl pyridine and polyethyleneimine.

Extremely low concentrations of the polymer may be used, i.e., concentartions as low as 0.1 part per million are often effective in maintaining the membranes; however, higher concentrations may be advantageous particularly in their initial formation. The preferred concentration for a given amine will depend upon conditions such as the pressure used to force the aqueous phase through the substrate and the pore size of the substrate. The preferred concentration to maintain the membrane will ordinarily be in the range of 0.1 to 10 parts per million. Higher concentrations may be used but offer no advantage over a concentration within this range.

During the step of forming the membrane the pH of the aqueous phase is usually selected so that the polymer is in its charged form; the pH value depends upon the specific polymer used.

The polymer in the aqueous phase deposits in or on the pores at the leading surface, forming a charged membrane. After the membrane has been formed the pH of the aqueous phase in contact with it is adjusted to a value which produces the desired characteristics, i.e., typically the pH is changed sufficiently to make the membrane act as a membrane with the desired degree of conversion to a neutral membrane.

While not essential to our invention, it is desirable to change the pH slowly to avoid forming "cracks" or imperfections in the membrane.

Having thus described our invention the following example is offered to illustrate it in more detail.

Example I shows the rejection characteristics of a membrane formed from a weakly ionizable amine in accordance with our invention.

EXAMPLE I

An .05 M NaCl aqueous solution containing 100 parts per million polyvinyl pyridine (PVP) and having a pH of 4 was circulated under pressure past a flat disk of polyvinyl chloride having a nominal pore diameter of 0.45 micron and solution forced through it. The pressure employed was 1500 p.s.i.; the flow through the membrane was 125 gallons per square foot per day (g.p.d./ft.$^2$) after operation for a period of 130 minutes and the chloride rejection was 82%. After several days of tests with various feeds, an aqueous solution of 0.01 molar in sodium sulfate and containing 1 part per million polyvinyl pyridine was pumped past the membrane at a pressure of 1500 p.s.i. The rejection of sodium sulfate was 43% at a pH of 3 with permeation of 22 g.p.d./ft.$^2$. The pH was raised over a period of about 500 minutes to 10, a value high enough to convert the PVP to the neutral form. The resulting membrane rejected 83% of the sodium sulfate, with a permeation rate of 4 g.p.d./ft.$^2$.

We claim:
1. A method of making a dynamic salt-rejecting membrane by the steps comprising:
   (a) depositing an organic polymer on a substrate from a first aqueous phase, said polymer characterized in that it is a weakly ionizable electrolyte and is selected from the group of polymers which contain either carboxyl groups of primary, secondary, and tertiary amine groups, wherein the pH of said first aqueous phase is acidic in the case where the deposited polymer contains amine groups and is basic where the deposited polymer contains carboxyl groups; and then
   (b) contacting the deposited membrane with a second aqueous phase having a pH lower than said first aqueous phase where the polymer contains carboxyl groups but which has a higher pH than the first aqueous phase where the polymer contains amine groups.

2. The method according to claim 1 in which at least a portion of the amine groups of the selected polymer are quaternized.

3. The method of claim 1 wherein the polymer is polyvinyl pyridine.

References Cited

UNITED STATES PATENTS

| 2,593,540 | 4/1952 | Cornwell et al. | 210—23 |
| 3,342,728 | 9/1967 | Malm et al. | 210—22 X |
| 3,413,219 | 11/1968 | Kraus et al. | 210—321 X |

ALFRED L. LEAVITT, Primary Examiner

C. R. WILSON, Assistant Examiner

U.S. Cl. X.R.

210—23, 321, 506, 508